United States Patent [19]

Geyer et al.

[11] 4,365,258

[45] Dec. 21, 1982

[54] OPTICAL DISC UNIT, FABRICATION METHOD AND COOPERATING WRITE AND/OR READ APPARATUS

[75] Inventors: Frederick F. Geyer; Eric M. Leonard, both of Rochester, N.Y.

[73] Assignee: Eastman Kodak Company, Rochester, N.Y.

[21] Appl. No.: 264,313

[22] Filed: May 18, 1981

[51] Int. Cl.³ .............................................. G01D 15/32
[52] U.S. Cl. ................................. 346/137; 346/135.1; 358/342; 369/284; 369/287
[58] Field of Search .................. 346/137, 135.1, 76 L; 369/283, 284, 286, 287, 291, 111; 428/64–66, 68, 69; 358/128.5

[56] References Cited

U.S. PATENT DOCUMENTS

| | | | |
|---|---|---|---|
| 3,336,583 | 8/1967 | Comstock, 3rd | 340/174.1 |
| 3,359,549 | 12/1967 | Farrand et al. | 340/174.1 |
| 3,373,413 | 3/1968 | Treseder | 340/174.1 |
| 3,381,085 | 4/1968 | Johnson et al. | 178/6.7 |
| 3,430,966 | 3/1969 | Gregg | 346/137 |
| 3,805,292 | 4/1974 | Hashiguchi et al. | 360/135 |
| 3,815,146 | 6/1974 | Nash | 346/137 |
| 4,038,663 | 7/1977 | Day et al. | 346/1 |
| 4,074,282 | 2/1978 | Balas, Jr. et al. | 346/135 |
| 4,222,070 | 9/1980 | Howe | 358/128.5 |
| 4,264,911 | 4/1981 | Wilkinson | 346/137 X |
| 4,308,545 | 12/1981 | Lehureau | 346/137 X |

*Primary Examiner*—Joseph W. Hartary
*Attorney, Agent, or Firm*—John D. Husser

[57] ABSTRACT

An optical disc-unit including (i) a flexible, disc-shaped support bearing a record layer, (ii) a flexible disc-shaped cover sheet which is transparent to write/read light and (iii) annular retaining means which engage the support and sheet, in spaced relation, substantially continuously around peripheral regions. In preferred embodiments the retaining means symmetrically tension the sheet and support into substantially flat dispositions. Cooperative optical disc write/read apparatus and optical disc-unit fabrication methods are also disclosed.

27 Claims, 15 Drawing Figures

OPTICAL DISC UNIT, FABRICATION METHOD AND COOPERATING WRITE AND/OR READ APPARATUS

CROSS-REFERENCE TO RELATED APPLICATIONS

Reference is made herein to U.S. patent application Ser. No. 023,434, filed Mar. 23, 1979, in the names of Thomas and Wrobel, and U.S. patent application Ser. No. 124,381, filed Feb. 25, 1980, in the names of Howe and Wrobel.

BACKGROUND OF THE INVENTION

1. Field of the Invention

The present invention relates to record medium and apparatus useful in optical writing and/or reading of high density information and more particularly to improved configurations for optical discs and cooperating optical disc apparatus.

2. Description of the Prior Art

The currently preferred optical disc technology employs disc elements with spiral or concentric tracks of minute (e.g., on the order of a micron or less in size), optionally-detectable marks. One real-time mode of recording (writing) such marks is by scanning tracks on the disc with an equivalently small beam of radiation (e.g., from a laser) which is modulated "off or on" according to an eletrical signal representative of the information to be written. Information is recovered (read) by scanning the tracks with a larger, but still very tightly focused radiation (e.g. light) spot. The recovered information is in the form of a fluctuating electrical signal obtained from a photodetector that senses the read-out light reflected from the recorded disc. The benefits (e.g. high data storage density) inuring to recording with such small marks are very important; however, the problems encountered in precise implementation of the approach are very difficult. For example, focus of the write or read beam should be maintained with precision and the record surface should be protected e.g. from dirt and scratches.

More specifically, in order to write and read information in the form of such minute markings, optical systems of high numerical aperture are used to focus light to equivalently minute spots. Such optical systems have extremely small depths of focus and the proper positional relation between the writing or reading optical system and the optical disc record surface must be stringently maintained. Therefore it is highly desirable that the record layer, and thus optical disc support surface underlying the record layer, be smooth (relatively free of high-spatial-frequency variations from a nominal plane, e.g. such as caused by minute pits or bumps) and flat (relatively free of large amplitude, low spatial frequency variations e.g. such as caused by undulating surface variation of the support). Although complex focus-servo devices can effect lens adjustment to compensate for imperfect smoothness and flatness, these devices add to the cost and fragileness of the write/read apparatus. The degree of complexity of the focus-servo devices is proportional to the degree of such disc imperfections and the speed of operation.

One approach to achieve requisite smoothness and flatness has been to form the disc substrate of glass with a ground and polished surface. This requires a time consuming and costly fabrication procedure. Another approach is to mold a plastic disc substrate with a highly finished surface and apply a surface smoothing sub-layer. However, it is extremely difficult to mold such plastic discs having adequate surface characteristics with a good yield; and this support fabrication method is also relatively costly.

Several different approaches have been suggested for protecting the disc recording layer surface from dirt and scratches. One is to overcoat that surface with a transparent protective layer of sufficient thickness to locate the exterior protective surface out of the depth of focus of the optical system. However, protective layers of this thickness require complicated optical correction of aberrations and can present problems in certain deformation recording processes for the recording layer. An alternative approach described in U.S. Pat. No. 4,038,663 is to centrally attach a flexible disc cover (in spaced relation to the record surface of a rigid optical disc) and "fly" the cover sheet above the record layer during write or read operations. Another approach disclosed in U.S. Pat. No. 4,074,282 provides inner and outer coaxial spacers to support a transparent cover plate in spaced relation from the record surface of a rigid optical disc.

While the above-noted and other protective layer or protective cover member approaches are useful to avoid scratch or dirt problems, they do not simplify the above-noted problems in meeting precise smoothness and flatness requirements.

SUMMARY OF THE INVENTION

One general purpose of the present invention is to provide improved optical disc and cooperating apparatus configurations to cope with the problems outlined above. Thus an important feature of the invention is to provide improved configurations for meeting smoothness, flatness and protective requirements in optical disc writing and/or reading.

One particularly desirable advantage of the present invention is that it obviates the use of rigid supports. This attribute is of great significance in fabrication, for the recording layer(s) can be applied to flexible webs in a continuous run, with many discs subsequently being cut from the web. Rigid disc formats are not readily susceptible to such coating techniques. Another desirable attribute of certain embodiments of the present invention is the enhancement of dimensional stability in the face of environmental stresses. This relaxes design requirements for cooperating apparatus, e.g. as tracking servo devices.

In one general aspect the present invention relates to an improved optical disc-unit adapted for the writing and/or reading of high density information and comprising (i) an optical disc including a flexible, disc-shaped support carrying a record layer; (ii) a disc cover, opposing the record layer, comprising a flexible, disc-shaped sheet which is substantially transparent to such writing and/or reading wavelengths and which is generally coextensive with the optical disc and (iii) annular retaining means, engaging said support and said sheet around respective annular peripheral regions, for positioning the sheet and record portions of the opposing record layer in spaced relation. In particularly preferred embodiments central portions of the flexible sheet and flexible support are held in cylindrically-symmetric tension by said retaining means. In other preferred embodiments the support and cover sheet are continuous surfaces and the retaining means cooperates with the retained sheet and support portions to substantially seal the space between the continuous sheet and support. In other preferred embodiments the optical disc support is held in a relatively lower tension by the retaining means, which further includes index surface means for positioning said support in an abutting relation with a tensioning and/or positioning surface of optical disc write/read apparatus. Thus the optical disc-unit can be stored with the optical disc in such relatively lower tension and used with the optical disc in a relatively higher tension to enhance its flatness.

In a related aspect the present invention relates to optical disc write/read apparatus adapted to receive, predeterminedly position and/or tension such an optical disc-unit. In another related aspect the present invention relates to improvements in optical disc apparatus comprising such a disc-unit and cooperative receiving, positioning and/or tensioning structure. In another aspect the present invention relates to improved methods for fabricating optical disc units. Other improvements and advantages of the present invention will become more evident in view of the subsequent description of preferred embodiments of the invention.

BRIEF DESCRIPTION OF THE DRAWINGS

The description of preferred embodiments refers to the attached drawings wherein:

FIGS. 6-A and 6-B are cross-sectional views of portions of another alternative preferred disc-unit embodiment;

DETAILED DESCRIPTION OF THE PREFERRED EMBODIMENTS

Figure 1:
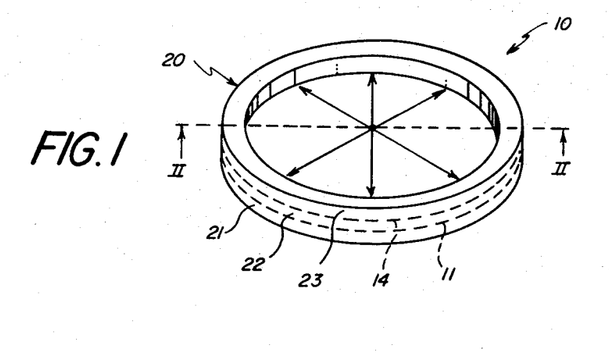
FIG. 1 is a perspective view of one preferred optical disc-unit configuration illustrating the general approach of the present invention.
Figure 2:
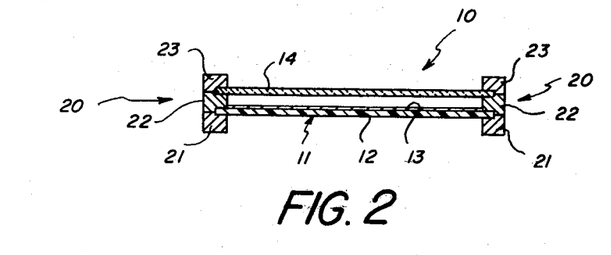
FIG. 2 is a sectional view of the FIG. 1 disc-unit configuration.

Referring to FIGS. 1 and 2, the general approach of optical disc-unit configurations in accord with the present invention can be explained. Thus, the optical disc-unit 10 includes an optical disc 11 in the form of a continuous, flexible, disc-shaped support 12 having recording layer 13 (and other appropriate layers) formed on one major surface of the support. The disc-unit also includes a disc cover in the form of a continuous, flexible, disc-shaped sheet 14 which is substantially transparent with respect to the write and/or read wavelength suitable for use with the record layer 13. The diameter of the disc cover sheet 14 corresponds generally to the diameter of the optical disc 11, and, as shown, both elements are supported in spaced relation by support structure of the disc-unit 10 which engages peripheral annular regions of those elements.

More particularly the disc-unit 10 includes annular retaining means, denoted generally 20, which engage the optical disc support 12 and the cover sheet 14 substantially continuously around respective annular peripheral portions in a manner positioning central portions of those elements into spaced relation. It is highly preferred that the cover sheet 14 and disc support be retained in cylindrically-symmetric tension, and in the FIG. 1 and 2 embodiment this is accomplished by cooperating annular ring members 21, 22 and 23. It is also highly preferred in accordance with the present invention that the cooperative engagement between the disc support 12, cover sheet 14 and retaining means 20 significantly seal the space between the recording layer 13 (on support 12) and the inner surface of the cover sheet 14. Various preferred specific retaining means configurations for achieving these results will be described subsequently; however first a brief description of useful and preferred characteristics for the optical disc support and the cover sheet is appropriate.

Considering first the optical disc support, thickness uniformity, strength, dimensional stability and surface quality are significant characteristics to be considered in selecting a support material. In general, plastic materials, e.g. extruded and biaxially oriented Estar polyethylene terephthalate film base, provide desirable supports. However, other materials, e.g. thin metal films are also useful.

Thickness uniformity is important in support selection to minimize large amplitude, low spatial frequency vertical displacements of the supported recording layer. In general, support thickness variation usually varies, as a fixed percentage (e.g. 5%) with total support thickness. For this reason supports with nominal thicknesses less than about 10 mils are preferred.

With regard to strength, the supports preferably have a sufficiently high Young's modulus to sustain utilized tension stresses with small strain. This is particularly important when using recording layer susceptible to fracture or similar distortion by support strains. The support also is desirably highly stable dimensionally with respect to environmental stresses resulting from excursions of relative humidity and/or temperature. This characteristic has particular significance because non-uniform dimensional changes could distort record information. Additionally it is preferred that support materials have relatively high dimensional stability (compared to other plastic materials) with regard to loss of tension over time. Such loss of tension can cause support sag and materials with relatively long relaxation times therefore are preferred. Another preferred aspect for supports is a good surface quality compatible with coating of a smoothing layer.

Now considering the cover sheet, it is important that it be highly optically transparent at write and/or read wavelengths to be utilized. The cover sheet also should be substantially non-birefringent, substantially homogeneous and free from striae and occlusions of an extent that would interfere with recording and reading. Also, it is desirable that thickness variation of the cover sheet be sufficiently small to allow for simple correction of aberrations incident to light passage therethrough. The nominal thickness preferably is of a magnitude (e.g. less than about 300μ) where normal, high quality, high numerical aperture objectives are available. The strength and dimensional stability characteristics of the cover sheet desirable are like those described above with respect to the optical disc supports.

A specific exemplary preferred optical disc support is biaxially oriented Estar film base of 4 mil nominal thickness having a Young's modulus of approximately $6.8 \times 10^5$ psi. A specific exemplary preferred cover sheet is solvent cast cellulose triacetate (such as the support of Eastman Color Negative Film 5247) of 5.25 mil nominal thickness and having a Young's modulus of approximately $6 \times 10^5$ psi.

The preferred operative spacing between optical disc 11 and cover sheet 14 depends on the numerical aperture of the lens utilized, the thickness of the cover sheet and the desired degree of protection from dirt and scratches on the external cover sheet surface. For a cover sheet having a refractive index of n=1.5, the table set forth below illustrates useful minimum operative spacings "S" (i.e., between the recording surface and the bottom of the disc cover in the utilized portion of the disc) that will provide the same degree of protection from dust, scratches, etc., as does a 1 mm thick, in situ, transparent overcoat of index n=1.5 used with a 0.5 NA lens. The table lists S for various NA lenses and cover sheet thicknesses of 100μ, 133.4μ and 175μ.

| NA | S(100μ) | S(133.4μ) | S(175μ) |
| --- | --- | --- | --- |
| 0.5 | 0.545mm | 0.5246mm | 0.4991mm |
| 0.6 | 0.4085mm | 0.3891mm | 0.3648mm |
| 0.65 | 0.353mm | 0.3342mm | 0.3108mm |
| 0.7 | 0.3032mm | 0.2853mm | 0.2629mm |
| 0.75 | 0.2578mm | 0.2408mm | 0.2196mm |
| 0.8 | 0.2152mm | 0.1994mm | 0.1797mm |
| 0.85 | 0.1743mm | 0.1601mm | 0.1423mm |
| 0.9 | 0.1332mm | 0.1211mm | 0.1059mm |
| 0.95 | 0.08814mm | 0.0792mm | 0.06797mm |

In view of the "S" values shown in the above table, it will be appreciated by one skilled in the art, normal working distances (the value of S+0.001" to 0.004" for clearance between the top of the cover and the lens) pertain, thus biological objectives can be used.

At this stage, it also should be noted that the optical disc-unit approach of the present invention is useful with a wide variety of recording systems (i.e. record stratum and cooperating write/read apparatus). In one particularly preferred recording system the record stratum 13 includes a deformable dye-binder layer with a reflective surface or reflective layer between the dye-binder layer and the support 12. Such dye-binder layers can be coated in continuous-runs on flexible webs and provide significant fabrication advantages. U.S. patent application Ser. No. 023,434, filed Mar. 23, 1979, in the names of Thomas and Wrobel, and U.S. patent application Ser. No. 124,381, filed Feb. 25, 1980, in the names of Howe and Wrobel, disclose preferred optical disc configurations. However, the record stratum can be of many other kinds known in the art, the significant aspect being that optical disc support 12 is flexible, preferably continuous, and has, as appropriate for a particular application, the other characteristics outlined above.

Figure 3:
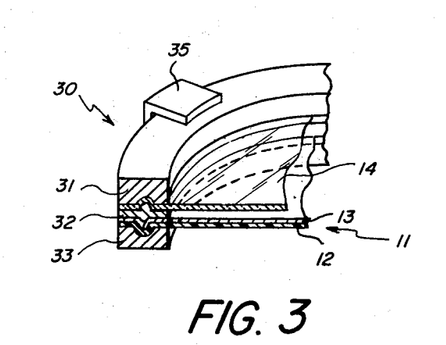
FIG. 3 is a fragmented perspective view of a portion of one specific disc-unit configuration in accord with the present invention.

Referring now to FIG. 3, one preferred retaining means 30 for engaging and urging support 12 and cover sheet 14 into spaced relation can be seen. In general this embodiment comprises three cooperating annular rings, viz., upper ring 31, spacer ring 32 and lower ring 33. As shown, spacer ring 32 is located between annular peripheral portions of support 12 and cover sheet 14 and has raised flanges extending from central portions of its upper and lower surfaces at a location to cooperate in a fitting relation with corresponding grooves formed respectively in the central portions of upper and lower rings 31 and 33. When the sheet 14 and support 12 are located respectively between rings 31-32 and 32-33 and the rings are clamped together into fitting relation, both of those continuous, flexible, disc-shaped members are drawn into cylindrically symmetrical tension. This maintains the proper spaced relation between the members, maintains a flat orientation of the members and provides an air seal of the space between the members. REtaining clamps 35 are provided around the retaining means periphery to retain the press-fit cooperation of the rings.

Figures 4, 5:
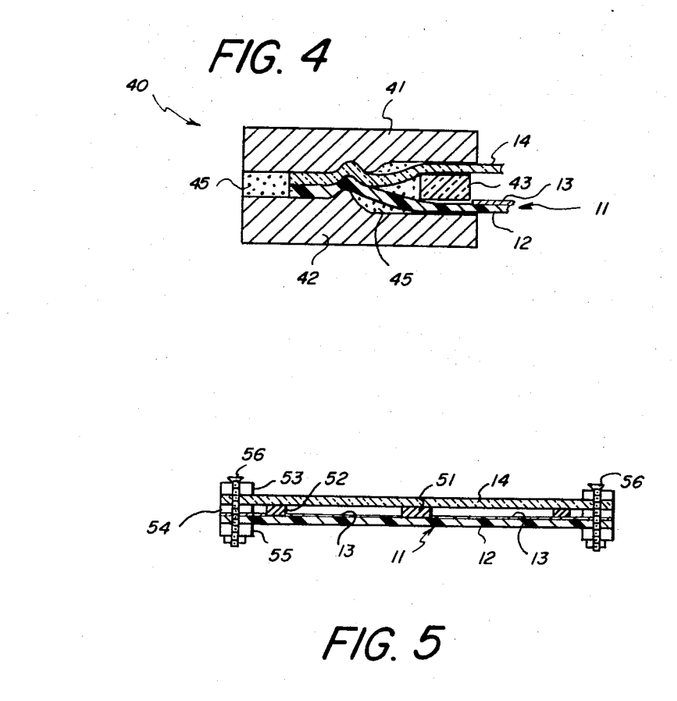
FIG. 4 is a cross-sectional view of a portion of an alternative disc-unit embodiment.
FIG. 5 is a cross-sectional view similar to FIG. 2 but of another embodiment of the present invention.

FIG. 4 discloses another preferred embodiment for retaining means, denoted generally 40. In this embodiment upper and lower annular retaining rings 41 and 42 respectively have a cooperating female groove and male flange or rib extending around their opposing central surfaces. Spacer ring 43 is located between recessed inner portions of the more radially inward surfaces of rings 41 and 42. In fabrication of this disc-unit embodiment the spacer ring 43 is placed between support 12 and cover sheet 14, and adhesive 45 is provided between rings 41, 42 before they are clamped into their interfitting relation, which tensions the cover sheet and support and seals the space therebetween The upper and lower rings are held in this interfitting relation until the adhesive is fixed.

FIG. 5 discloses another preferred embodiment of optical disc-unit 50 in accord with the present invention. In this embodiment a central spacer disc 51 is positioned (e.g. affixed to cover sheet 11) between the central portions of the cover sheet and the optical disc. Also, an annular spacer ring 52 is similarly positioned between outer regions of the cover sheet and optical disc. Of course, elements 51 and 52 can be used in combination or singly. The annular retaining means in this embodiment comprises retaining rings 53, 54 and 55 having aligned, circumferentially spaced holes adapted to receive bolts 56. In fabrication, the disc support and cover sheet are of larger diameter than illustrated and are grasped outside the retaining rings by means which appropriately tension them. The retaining means are then secured by bolts 56 and the outer portions of the support and cover sheet released and trimmed.

Figure 6A:
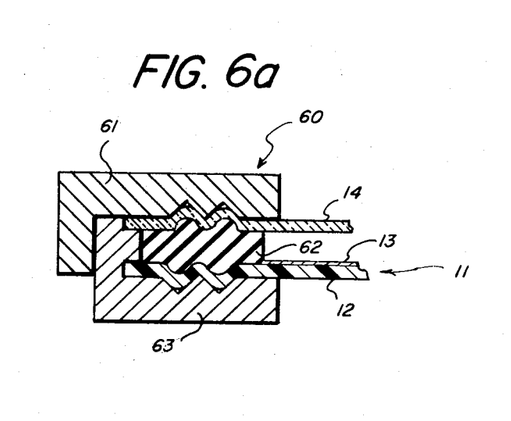
Figure 6B:
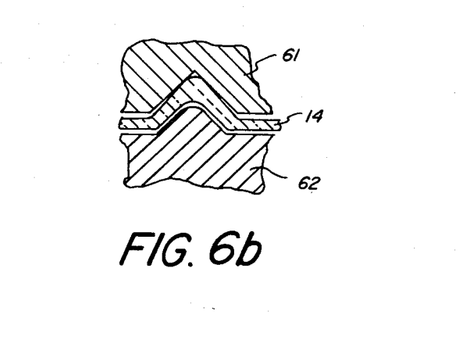

FIG. 6-A discloses another preferred embodiment of retaining means, denoted generally 60. This preferred configuration is similar to the FIG. 3 embodiment except that the spacer ring 62 has a plurality of convex flange portions or ribs which cooperate with angular "V-shape" grooves of upper and lower rings 61, 63. Also, it will be noted that the outer sectors of upper and lower rings 61, 63 have coupled portions which cooperate to engage the retaining means portions in a tightly interfitting relation. In this embodiment the engagement is a force fit, however, cooperative thread portions or other means can be utilized. The engagement of the members 61, 62, 63 tensions the continuous, flexible cover sheet 14 and support 12 and seals the space therebetween. The specific flange-groove construction of this embodiment (see FIG. 6-B) provides space for cold flow of the sheet and support regions engaged therebetween and thus enhances firm retention. In a preferred mode of fabrication the cover sheet 14 and support 12 are placed between members 61, 62, 63 as shown and engaging force is applied first at the outer ring regions. This secures the outer periphery of the support and cover sheet. The groove and rib portions are then forced together to further secure and tension the cover sheet and support. The amount of tension can be controlled by the number and size of groove-rib portions.

With the foregoing explanation of exemplary preferred retaining means, various other configurations within the scope of this invention will occur to those skilled in the art. However, some description of general and preferred tension forces is appropriate. In general, preferred tensions for the optical disc support and cover sheet are from substantially zero to just below the elastic limit, or yield point, of those members. More specifically, the preferred tension depends upon the desired degree of planarity for the particular member (i.e. size, composition, etc.) used and upon the particular use mode for the disc-unit, as will be described in more detail subsequently. It is highly preferred that the disc support and cover sheet be supported in a manner positioning their operative write/read portions in proper spaced relation. This again will depend upon specific embodiment of disc-unit selected (e.g. whether a central spacer is provided). Preliminary testing indicates that cylindrical symmetric tension tends to enhance the dimensional stability of the retained member. Thus it is presently preferred that at least the optical disc support have sufficient tension (in its storage condition) to obtain this advantage. As mentioned, it is preferred that storage or operating tension be below the elastic limit of the particular member; however, in certain applications some yield can be acceptable as long as surface planarity remains in the desired tolerance. In general, it is highly preferred that the tension (particularly storage tension) be selected with respect to the support material so that the stressed materials's continuous relaxation over time (i.e. material creep) is slow enough to insure adequate spacing and planarizing tension throughout the expected product life period.

Figure 7:
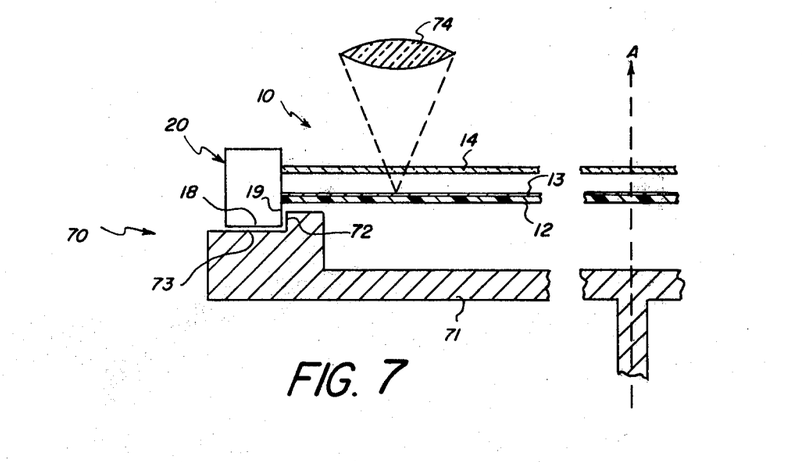
FIG. 7 is a schematic fragmented sectional view of an optical disc-unit and cooperative optical disc apparatus in accordance with the present invention.

Referring now to FIG. 7, one preferred embodiment of optical disc apparatus useful in combination with the above-described optical disc-units is shown. The apparatus 70 is similar to the various other optical disc write/read apparatus known in the art, and only the portions cooperating more directly with the present invention will be described in detail. Thus, apparatus 70 comprises a turntable 71 adapted for rotation on axis A by drive means (not shown). The turntable 71 includes receiving means having a reference surface 73 which is rotatable about axis A in a plane substantially normal to axis A. The receiving means also includes a centering surface 72 adapted to locate a received disc-unit in a predetermined relation (e.g. concentric) with respect to axis A. Apparatus 70 also includes an optical system, represented by lens 74, which is adapted to focus write/read light in a focal plane that is normal to the axis of rotation.

In FIG. 7, the optical disc-unit 10 is shown placed on the turntable 71. As illustrated, the retaining means 20 of the disc-unit 10 has an index surface 18 which is adapted to cooperate with reference surface 73 of the receiving means and precisely locate the recording layer 13 of disc-unit 10 at the focal plane of lens 74.

Retaining means 20 also has a centering surface 19 which cooperates with surface 72 of the receiving means to locate the disc-unit 10 in proper relation to the rotational axis A. The retaining means 20 of disc-unit 10 can be clamped, e.g. mechanically or magnetically, to the receiving means, and upon rotation the lens operates on the recording layer 13 through cover sheet 14 and the intervening air space. Thus scratches, dirt, etc., on the cover sheet are out of the depth of lens focus and do not impair writing or reading of the recording layer 13. Also, recording layer 13 is maintained in a flat, smooth condition, in the focal plane of lens 74, with highly useful accuracy due to the tensioned condition of its support 12.

Figure 8:
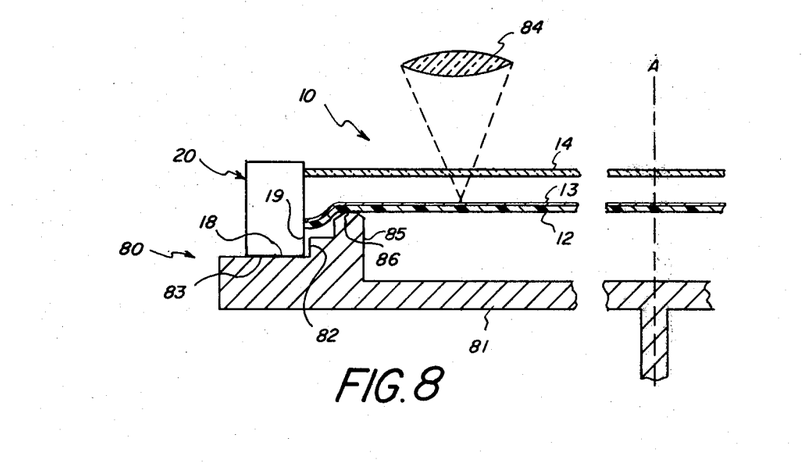
FIG. 8 is a view like FIG. 7 but of an alternative embodiment of optical disc-unit and cooperative optical disc apparatus.

Considering the foregoing it will be appreciated that, in the FIG. 7 embodiment, the proper location of recording layer 13 (relative to the lens 74) depends on proper dimensioning of both reference surface 73 and retaining means 20. Referring to FIG. 8, in an alternative preferred embodiment of the present invention, apparatus 80 significantly reduces the tolerances for retaining means 20 of disc-unit 10. Thus apparatus 80 is similar to the FIG. 7 embodiment having lens 84, turntable 81 and other typical structure for optical disc write/read apparatus. However as shown, apparatus 80 includes an annular flange 85 extending concentrically around the axis A of turntable rotation which provides an annular abutment surface 86. Surface 86 is carefully toleranced for rotation in a plane substantially normal to axis A and has predetermined dimensions (with respect to the location of the focal plane of lens 84 and the thickness of support 12) so that the recording layer 13 of a disc-unit 10 located on the turntable will coincide with the lens focal plane. Thus the internal tolerances of retaining means 20 (in locating support 12 relative to index surface 18) are significantly relaxed. Similarly the relation between reference surface 83 and index surface 18 is relaxed. The more readily controlled tolerance between centering surface 19 and surface 82 of the turntable receiving means again controls centering of the disc-unit 10 with respect to optical axis A.

An additional feature of the FIG. 8 embodiment is significant. It will be noted that the relation of the turntable receiving means, retaining means 20 and abutment surface 86 is such that the support 12 is further tensioned (in cylindrically-symmetric directions) in response to its mounting in the receiving means. This affords the ability to construct disc-unit 10 so that support 12 is in a relatively low, "spacing" tension during storage and in a relatively high, "planarizing" tension during use. This feature can decrease long term failure of the support, which might occur in some materials, when stored in high tension. In addition, this aspect of the invention has the advantage of compensating for tension changes due to variation in the operating environment.

Figure 9:
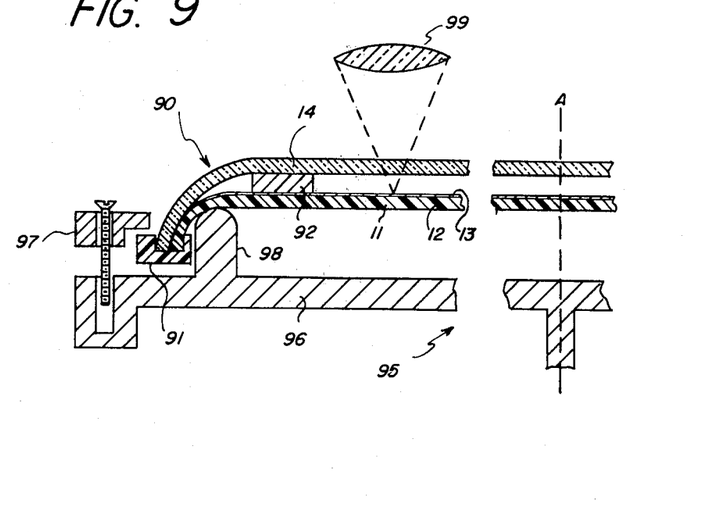
FIG. 9 is a view similar to FIG. 7 but of another embodiment of optical disc-unit and cooperative apparatus.

FIG. 9 illustrates yet another disc-unit 90 and cooperative apparatus 95 in accord with the present invention. Disc unit 90 comprises cover sheet 14 and optical disc 11 like those previously described. The peripheral portions of both of those members are heat formed to a downturned configuration as illustrated and engaged by a single annular clamp 91. A ring spacer 92 is provided between the opposing surfaces of those members at an outer region of the disc-unit. In this embodiment the disc cover and disc support are substantially self-supporting. In use the disc-unit 90 is placed on turntable 96 as illustrated and tensioning ring 97 is screwed down on the turntable to tension the sheet 14 and disc 11. Abutment flange 98 is precisely located to position the optical disc tensioned thereover in the focal plane of lens 99.

Figure 10:
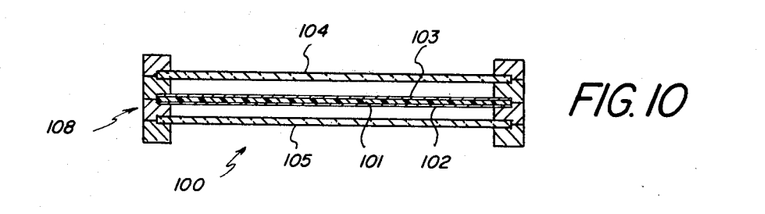
FIGS. 10 and 11 are views similar to FIG. 2 but of yet other embodiments of disc-units according to the present invention.
Figure 11:
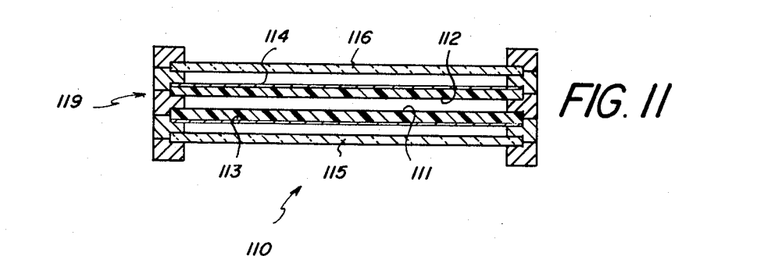

FIGS. 10 and 11 illustrate two-sided disc-unit configurations in accord with the present invention. The FIG. 10 embodiment comprises an optical disc support 101 having recording layers 102, 103 on opposite sides. This element can be two supports coated on one side and laminated together. Cover sheets 104, 105 oppose respective record surfaces positioned in spaced relation by retaining means 108, which can be formed of separate rings cooperating in any one of the previously described configurations.

The FIG. 11 embodiment 110 is similar to that shown in FIG. 10 but comprises two separate optical disc members 111, 112 retained by ring means 119 with respective opposing cover sheets 115, 116 also retained in spaced relation to their record layers 113, 114.

Figure 12:
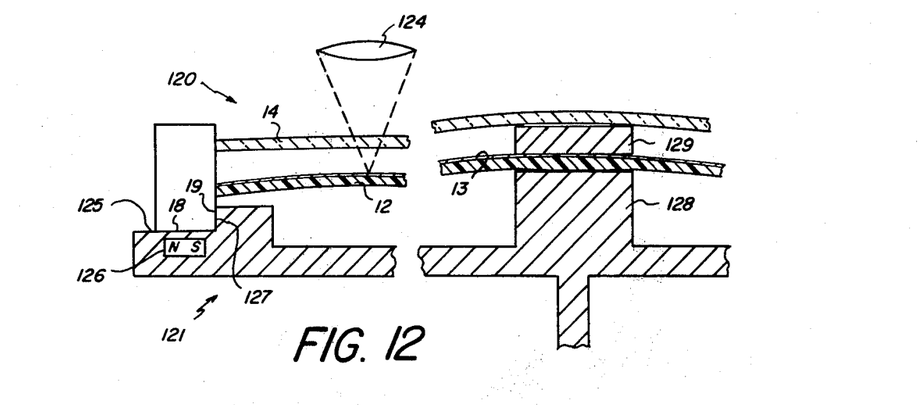
FIGS. 12–14 are schematic, fragmented sectional views illustrating other alternative embodiments of optical disc-unit and cooperative apparatus in accordance with the present invention.

FIG. 12 illustrates other preferred embodiments, viz., optical disc-unit 120 and cooperative apparatus 121. The apparatus 121 is similar to the FIG. 7 embodiment having a lens 124, turntable 122 and other typical structure for optical disc write/read apparatus. A reference surface 125 cooperates with index surface 18 of the disc-unit to locate the record layer in proper relation to the lens 124 (e.g. when held by magnet means 126). A centering surface 19 of the disc-unit similarly cooperates with surface 127 of the turntable to locate the disc-unit axially on the turntable. In this embodiment the turntable has a central abutment surface 128 which engages the central portion of the optical disc support to symmetrically tension the support. Also it will be noted that the disc-unit comprises a central spacer 129, generally concentric with surface 128 to maintain proper spaced relation between the optical disc and the cover sheet.

Figure 13:
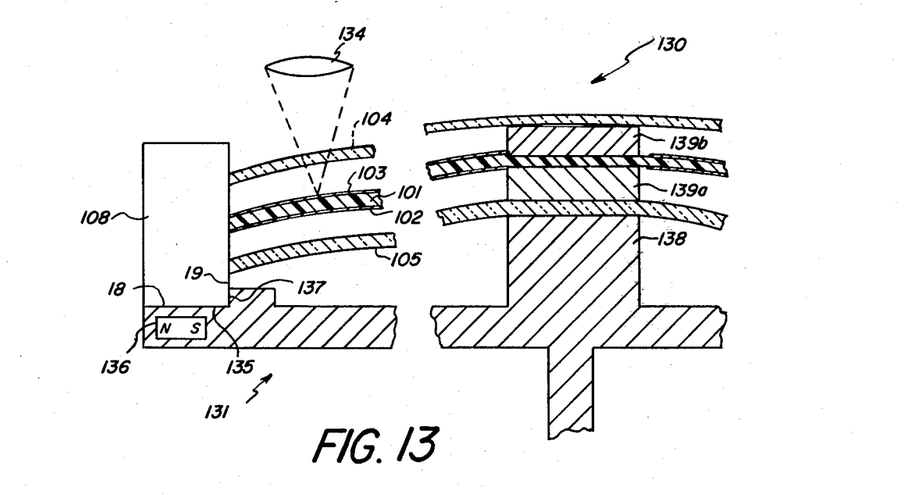

FIG. 13 illustrates another preferred optical disc-unit and cooperative apparatus configuration in accordance with the present invention. The disc-unit is similar to unit 100 and described with respect to FIG. 10; however, the unit 130 includes central spacers 139a and 139b between the disc 101 and cover sheets 104. The apparatus 131 is like that described with respect to FIG. 12 featuring central abutment surface 138 to tension disc 101 via cover sheets 104 and spacers 139a or 139b (depending on whether record layer 103 or 102 is being utilized).

Figure 14:
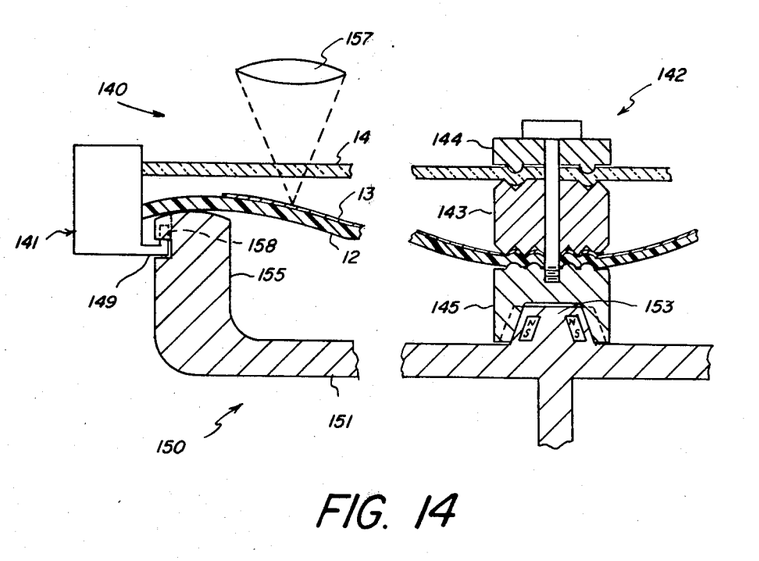

FIG. 14 illustrates an alternative disc-unit embodiment 140 which incorporates certain features of the present invention and is adapted for central engagement by the turntable 151 of cooperative write/read apparatus 150. In this embodiment the disc-unit 140 has peripheral retaining means 141 (e.g. one of the kinds previously described) and also includes a central post assembly 142 which is adapted for attachment to the turntable 151. More specifically, the post assembly includes a central spacer post portion 143 and upper and lower post portions 144 and 145 which respectively have cooperating annular groove and rib portions adapted to uniformly grip interior circular regions of the optical disc 12 and cover sheet 14. A bolt 146 couples the post assembly portions to symmetrically engage interior disc and cover sheet regions. Lower post portion is recessed and grooved to interfit with key flanges on the magnetic chuck 153 of the turntable 151.

The turntable 150 also includes annular abutment flange 155 which has reference surface 156 for tensioning and positioning the optical disc in proper relation to lens 157 when the disc-unit is seated in the magnetic chuck 153. If desired, bayonet slots 158 can be provided around the periphery of flange 155 to receive and retain cooperative lugs 149 of the disc-unit. Thus, the disc-unit retaining means 141 is inserted into turntable flange 155 and rotated to lock lugs 149 in slots 158. This also properly orients the drive transmission portions of the disc-unit with chuck 153. The central post is then pressed down to magnetically couple the disc-unit to the chuck 153. This predeterminedly tensions and locates the optical disc vis a vis the turntable 150 and lens 157.

The invention has been described in detail with particular reference to certain preferred embodiments thereof, but it will be understood that variations and modifications can be effected within the spirit and scope of the invention.

What is claimed is:

1. An optical disc-unit adapted for the optical writing and/or reading of high density information, said unit comprising:
   (a) an optical disc including a flexible, disc-shaped support carrying a record layer;
   (b) a disc cover opposing said record layer and comprising a flexible, disc-shaped sheet which is substantially transparent to writing and/or reading wavelengths and which is generally coextensive with said optical disc; and
   (c) annular retaining means, engaging said support and said sheet substantially continuously around annular peripheral regions, for positioning the sheet and record portions of said layer in spaced relation.

2. The invention defined in claim 1 wherein said retaining means is constructed to hold said peripheral regions and to exert generally-uniform, radially-outward force on central portions of said support and sheet, whereby said support and said sheet are substantially parallel in cylindrically-symmetric tension.

3. The invention defined in claim 1 or 2 wherein said support and said cover sheet have continuous surfaces and said retaining means cooperates with said engaged regions to substantially seal the space between said continuous sheet and support with respect to the external atmosphere.

4. The invention defined in claim 1 or 2 wherein said support is engaged in cylindrically-symmetric tension substantially below its elastic limit and wherein said optical disc-unit further includes index surface means for positioning a region of said support in an abutting relation with a tensioning abutment surface of optical write and/or read apparatus, whereby said optical disc-unit can be stored with said optical disc in relatively lower tension and used in such apparatus in relatively higher tension.

5. The invention defined in claim 1 or 2 wherein said retaining means comprises a first member, an intermediate member and a third member disposed in opposing relation with said peripheral regions of said sheet and said support interleaved therebetween.

6. The invention defined in claim 5 wherein opposing surfaces of said first member and said intermediate member have cooperative rib and groove portions and opposing surfaces of said third member and said intermediate member have cooperative rib and groove portions, said members being disposed in inter-pressing relation with portions of said sheet and said support deformed between interfitting rib and groove portions thereof.

7. The invention defined in claim 6 wherein said rib portions have a generally convex profile and said groove portions have an angular profile whereby the interfit between such portions provides space to accommodate cold flow of interleaved sheet and support material.

8. For use with optical disc appartus of the kind adapted for the optical writing and/or reading of high density information and including a rotatable receiving means having a reference surface which is rotatable about an axis in a first plane that is normal to said axis and lens means for focusing write and/or read light at a focal plane parallel to said first plane, an optical disc-unit comprising:
   (a) an optical disc including a flexible, disc-shaped support carrying a record layer;
   (b) a disc cover opposing said record layer and comprising a flexible, disc-shaped sheet which is substantially transparent to writing and/or reading wavelengths and which is generally coextensive with said optical disc; and
   (c) annular retaining means, engaging said support and said sheet around their peripheral regions, for positioning the sheet and the record area of the support in spaced relation, said retaining means including an index surface adapted to predeterminedly position said unit on the reference surface of such apparatus receiving means with said record layer proximate such apparatus focal plane.

9. The invention defined in claim 8 wherein said retaining means is constructed to hold said peripheral regions and to exert generally-uniform, radially-outward force on central portions of said support and said sheet, whereby said support and said sheet are substantially parallel in cylindrically-symmetric tension.

10. The invention defined in claim 8 or 9 wherein said support and said cover sheet have continuous surfaces and said retaining means cooperates with said engaged regions to substantially seal the space between said continuous sheet and support with respect to the external atmosphere.

11. The invention defined in claim 8 or 9 wherein said support is engaged in cylindrically-symmetric tension substantially below its elastic limit and wherein said index surface means is constructed to position said support in a predetermined tensioning relation with a tensioning abutment surface of such optical write and/or read apparatus, whereby said optical disc-unit can be stored with said optical disc in relatively lower tension and used in the predetermined focal plane of such apparatus in relatively higher tension.

12. The invention defined in claim 8 or 9 wherein retaining means comprises a first member, an intermediate member and a third member disposed in opposing relation with said peripheral regions of said sheet and said support interleaved therebetween.

13. The invention defined in claim 12 wherein opposing surfaces of said first member and said intermediate member have cooperative rib and groove portions and opposing surfaces of said third member and said intermediate member have cooperative rib and groove portions, said members being disposed in inter-pressing relation with portions of said sheet and said support deformed between interfitting rib and groove portions thereof.

14. The invention defined in claim 13 wherein said rib portions have a generally convex profile and said groove portions have an angular profile whereby the interfit between such portions provides space to accommodate cold flow of interleaved sheet and support material.

15. In optical disc write and/or read apparatus of the kind including: (i) optical disc-unit receiving means having a reference surface, which is rotatable about an axis in a first plane that is substantially normal to said axis, and (ii) lens means for focusing write and/or read light at a focal zone generally parallel to said first plane, an improved optical disc-unit comprising:
   (a) an optical disc including a continuous, flexible, disc-shaped support carrying a record layer;
   (b) a disc cover opposing said record layer and comprising a continuous, flexible, disc-shaped sheet which is optically transparent to such writing and/or reading light and which is generally coextensive with said optical disc; and
   (c) annular retaining means having index surface means contacting said reference surface and means, engaging each of said disc-shaped support and said disc-shaped sheet substantially continuously around respective annular peripheral regions, for positioning said sheet and the record portion of said layer in a spaced relation;
   said index surface means being predeterminedly located with respect to said support and said reference surface being predeterminedly located relative to said focal zone so that said record layer is proximate said focal zone.

16. The invention defined in claim 15 further including a tensioning abutment surface which is generally concentric to said axis and radially inward from said retaining means, said abutment surface being adapted for rotation with said receiving means in a second plane substantially normal to said axis and located with respect to first plane and said focal zone so that said support is uniformly tensioned by said abutment surface with the record layer substantially coinciding with said focal plane.

17. The invention defined in claim 15 wherein said reference surface and said retaining means are precisely constructed so that said record layer substantially coincides with said focal plane.

18. The invention defined in claim 15, 16 or 17 wherein said receiving means further includes axial centering means for contacting the periphery of said disc-unit and aligning the central axis of such unit on said axis of rotation.

19. Optical disc write and/or read apparatus adapted for use with an optical disc-unit of the kind including: (i) an optical disc having a continuous, flexible, disc-shaped support carrying a record layer and (ii) annular retaining means having index surface means and means for engaging said support substantially continuously around an annular peripheral region so as to urge said support into a generally flat condition, said apparatus comprising:
   (a) receiving means having a reference surface which is rotatable about an axis generally within a first plane that is normal to said axis; and
   (b) lens means for focusing write and/or read light generally at a focal zone that is generally parallel to said first plane,
   said first plane being predeterminedly located with respect to said focal zone so that when the index surface means of a received disc-unit contacts said reference surface, the support of such disc-unit is located proximate the focal zone of said lens.

20. The invention defined in claim 19 wherein said receiving means further includes a tensioning abutment surface which is generally concentric to said axis and radially inward from said index surface, said abutment surface being adapted to rotate in a second plane that is substantially normal to said axis, said second plane being located relative to said focal zone and said first plane so that the support of a disc-unit received on said index surface is subjected to cylindrically symmetric tension by said abutment surface and so that the record layer carried on such tensioned support substantially coincides with said focal zone.

21. The invention defined in claim 19 wherein said first plane is located with respect to said focal zone so that the record layer of such disc-unit substantially coincides with said focal zone.

22. The invention defined in claim 19, 20 or 21 wherein said receiving means further includes axial centering means for contacting the periphery of a received disc-unit and aligning the central axis of such unit on said axis of rotation.

23. The invention defined in claim 16 or 20 further including means for positively urging said index surface of retaining means into contact with said reference of said receiving means so as to positively tension said disc-unit support via said abutment surface.

24. A method of fabricating an optical disc-unit adapted for optical writing and/or reading of high density information, said method comprising the steps of:
(a) forming an optical disc including a continuous, flexible, disc-shaped support carrying a record layer;
(b) forming a disc cover including a continuous, flexible, disc-shaped sheet which is substantially transparent to writing and/or reading wavelengths and of diameter generally equal to said optical disc;
(c) forming first, intermediate and third annular retaining members of diameter generally equal to said optical disc, said first and intermediate members having cooperative rib and groove portions in radially inward surfaces thereof and said intermediate and third members having cooperative rib and groove portions in radially inward surfaces thereof;
(d) placing said first, intermediate and third members in opposing relation with respective groove and rib portions aligned for interfitting cooperation and with peripheral regions of said support and sheet interleaved therebetween; and
(e) manipulating said members into interfitting relation so as to dispose unretained portions of said support and said sheet in cylindrically symmetric tension.

25. The method defined in claim 24 wherein said manipulating step includes first engaging forcing outer peripheral portions of said members together to engage outer peripheral regions of said sheet and support therebetween and then forcing inner portions of said members together so as to deform portions of said sheet and web into the grooves of such members and thereby symmetrically tension inward portions of said sheet and support.

26. The invention defined in claim 1 or 8 further including a second record layer opposite said first-mentioned record layer and a second disc cover on the opposite side of said optical disc from said first-mentioned disc cover, said second cover comprising a flexible disc-shaped sheet that is substantially transparent to writing and/or reading wavelengths and which is coextensive with said optical disc, and wherein said retaining means engages said second disc cover substantially continuously around its peripheral regions to position it in spaced relation to said optical disc.

27. The invention defined in claim 16 or 20 wherein said tensioning abutment surface is annular and located to contact an annular region of said support proximate said retaining means.

* * * * *